(12) United States Patent
Daskalovic et al.

(10) Patent No.: US 7,398,258 B2
(45) Date of Patent: Jul. 8, 2008

(54) DIMENSIONAL REDUCTION USING DATA MATCHING IN HIGH DIMENSIONAL SPACE

(75) Inventors: Marc Daskalovic, Concord, NH (US); Eugene Zarakhovsky, Seattle, WA (US); Christian Eric Schrock, New York, NY (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 11/172,463

(22) Filed: Jun. 30, 2005

(65) Prior Publication Data

US 2007/0011181 A1    Jan. 11, 2007

(51) Int. Cl.
*G06E 1/00* (2006.01)
*G06E 3/00* (2006.01)
*G06F 17/30* (2006.01)
*G06F 7/00* (2006.01)
*G06F 15/18* (2006.01)
*G06G 7/00* (2006.01)

(52) U.S. Cl. .................................. 706/19; 707/2; 707/3

(58) Field of Classification Search .................. 706/19; 707/2, 3
See application file for complete search history.

(56) References Cited

U.S. PATENT DOCUMENTS 6,134,541 A * 10/2000 Castelli et al. .................. 707/2
6,453,252 B1 * 9/2002 Laroche ........................ 702/75

* cited by examiner

*Primary Examiner*—David R Vincent
*Assistant Examiner*—Ben M Rifkin
(74) *Attorney, Agent, or Firm*—Shook, Hardy & Bacon L.I.P.

(57) ABSTRACT

A method is provided to match an unknown data point with a known data point contained in a multi-dimensional data structure. The method may include receiving data from any multi-dimensional source where a query may be used to locate specific data points within that source. The method receives a number of inputs, including a Euclidean error distance and a number of reference points to use. Furthermore, the method determines optimal reference points to locate a relatively small number of data points within the data structure that possibly match the unknown point. Once possible match points are located, the method then determines the unknown point's match.

12 Claims, 11 Drawing Sheets

170 Unknown Data Point Number (Example)
11111111222222223333333344444444.55555555666666667777777788888888

172 Known Data Point 1
000000000000000.000000000000000009999999999999999999999999999999

174 Known Data Point 2
11111111222222223333333344444444.55555555666666667777777788888888

FIG. 3: Pre-Computation

FIG. 4: Optimize Data Structure

FIG. 5: REFERENCE POINTS

FIG. 5 CONT'D

FIG. 6: Matching

DIMENSIONAL REDUCTION USING DATA MATCHING IN HIGH DIMENSIONAL SPACE

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Today, deciphering unknown data has become an increasingly difficult, but necessary, task. As data and storage systems become more complex, programmers are finding that their old matching techniques are inefficient. One common method to identify unknown data is to compare it to known data stored in a database. If the unknown data point matches a point contained in the database, then the unknown data can be identified. However, this process requires one to check the unknown data against every piece of known data in the database. Today, test data is being stored in large multi-dimensional structures that hold enormous quantities. As a result, comparing everything in a database has become quite time consuming and CPU intensive. Furthermore, data itself can be rather large, requiring many complicated computations to match.

For example, this problem arises in the process of audio fingerprinting. Audio fingerprinting is the task of identifying an audio track that is missing or has incorrect metadata. A media player which plays audio files may wish to display the title of the song playing and its artist. Generally, the player will look to a file's metadata in order to determine title and artist. However, such information my be inaccurate or missing from the metadata. In order to determine the needed information, then, the player may try to match a signature or other electronic representation of the song to known signatures or other electronic representations of pre-computed songs. Essentially, the player tries to match the unknown metadata of the song to known metadata, or "fingerprints," that are stored in a database.

There are inherent performance challenges with matching audio fingerprints, though. For instance, once a song is processed, a 64 floating point number is produced and stored in a large multi-dimensional structure. Each digit of the number may correspond to a different dimension of the database. For audio fingerprinting, it is typical to have a 64 dimension database holding nearly 1,000,000 known fingerprints. Furthermore, finding a match requires comparing the unknown song to every pre-calculated fingerprint in the database. As can be imagined, comparing 1,000,000 64 floating point numbers that are housed in a 64 dimension database is time consuming.

Moreover, the comparison calculation of the unknown song to a known fingerprint is quite complex. It is performed by first mapping the unknown song and known fingerprints into multi-dimensional space. In order to compare songs, each known fingerprint's Euclidean distance from the unknown song is calculated. If the unknown song is close enough to a known fingerprint, it is considered a match. Euclidean distance measurements in multi-dimensional space are quite CPU intensive. Consequently, comparing an unknown song to every fingerprint in a multi-dimensional database is slow.

Therefore, a need arises for a method to accurately locate the section of a multi-dimensional database where a match may exist. If such an area can be pinpointed, only the known data within that area would need to be searched. Finding and searching such an area would greatly reduce the amount of time and processor power needed to identify unknown data. Audio fingerprinting is merely one illustration of the problem at hand. Similar difficulties arise in many applications performing comparisons in multi-dimensional databases. The ability to search such structures more efficiently would greatly reduce the time and CPU usage needed to perform data matching tasks.

SUMMARY

This invention provides a method and system for efficiently finding all the data points in multi-dimensional space that are within a given Euclidean distance to an unknown point. Specifically, the invention uses a set of reference points to exclude most of the known data points in a multi-dimensional database that are not within a specific distance to the unknown data point. This in turn eliminates the need to compare many points in the database, thus saving time and processor resources.

First, this invention receives a multi-dimensional database, consisting of pre-computed data mapped in multi-dimensional space. Optimal reference points are then selected, mapped into multi-dimensional space, and used to reduce the number of dimensions of the database. In order to select an optimal set of reference points, the invention calculates the Euclidean distances of each known data point in the database to each reference point in a given set. Those distances are then compared with the unknown point's distances away from each reference point. Points with similar distances away from the reference points as the unknown point are considered possible matches. Accordingly, the optimal set of reference points will return the fewest number of matches. Furthermore, when new data points become available within the database, the reference points can be re-optimized. However, once the optimal reference points are determined, they can be used to match numerous unknown points.

The optimal reference points are used to reduce the number of data points in a database needing to be compared against an unknown data point to identify it. This is done by applying each reference point in order and eliminating data points that are not within a specific distance to the unknown data point. From the remaining data points, the closest one to the unknown point can be considered the unknown's match.

DETAILED DESCRIPTION

The various embodiments of the present invention will be better understood from the detailed description provided below and from the accompanying drawings of various embodiments of the invention. However, the detailed description and drawings should not be read to limit the invention to the specified embodiments. Rather, these specifics are provided for explanatory purposes to help the invention be better understood.

Embodiments of the present invention provide a system and method for excluding most of the known data points in a multi-dimensional database that are not within a specific distance to an unknown data point. This in turn allows the unknown data point's match to be found much quicker by comparing it to a relatively small quantity of data points.

Specific hardware devices, programming languages, components, processes, and numerous details including operating environments and the like are set forth to provide a thorough understanding of the present invention. In other instances, structures, devices, and processes are shown in block diagram form, rather than in detail, to avoid obscuring embodiments of the present invention. But an ordinary-skilled artisan would understand that embodiments of the present invention may be practiced without these specific details. Further, illustrative data structures used to explain various embodiments of the present invention may be, but are not limited to, databases, spreadsheets, and any other apparatus capable of being a storage medium. Further still, illustrative processors used to explain the various embodiments of the present invention may be, but are not limited to, workstations, personal computers, mainframe computers, or any other suitable processing device. Also, a network may be, but is not limited to either an Internet network, Intranet network, local area network ("LAN"), metropolitan area network ("MAN"), wide area network ("WAN"), or a combination thereof without limiting the scope of the various embodiments of the present invention.

Exemplary Operating Environment

Figure 1A:
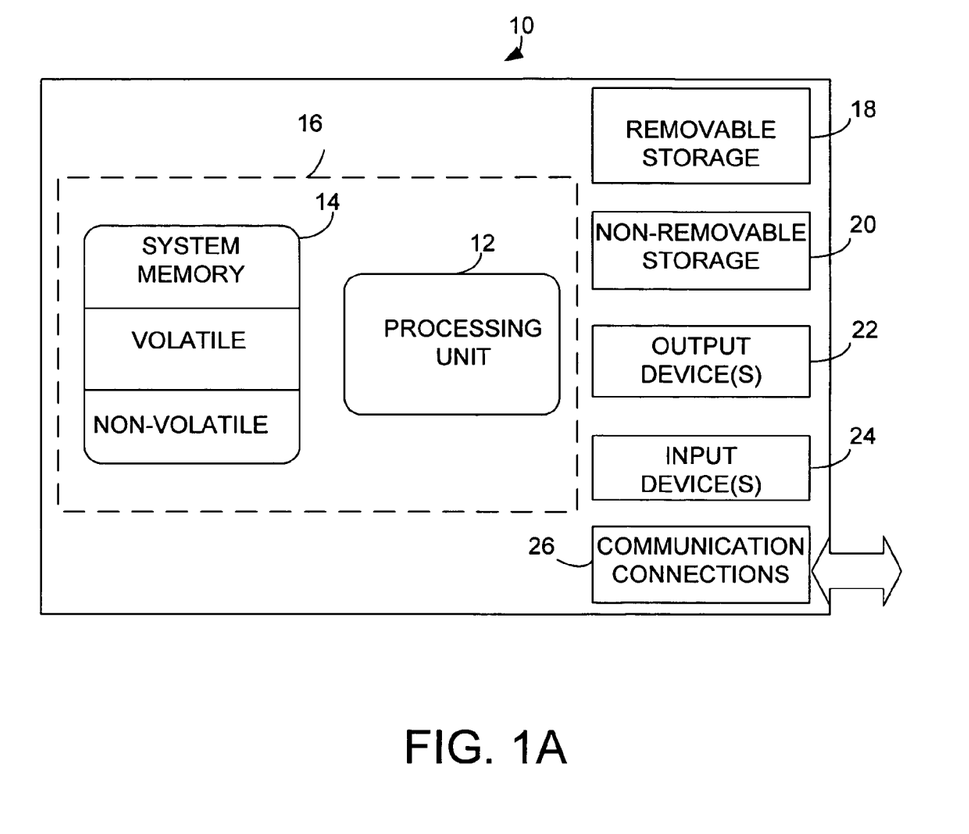
FIG. 1A illustrates a block diagram of a computing environment adapted to implement the present invention.

Turning to FIG. 1A, there is illustrated an exemplary embodiment of a computing system environment, labeled 10. The computing system environment 10 is only one example of a suitable computing environment and is not intended to suggest any limitation as to the scope of or use or functionality of the invention. Neither should the computing environment in 10 be interpreted as having any dependency or requirement relating to any one or combination of components illustrated in the exemplary operating environment 10.

The invention is operational with numerous other general purpose or special purpose computing system environments or configurations. Examples of well-known computing system environments and/or configurations that may be suitable for use with the invention include, but are not limited to, personal computers, server computers, handheld or laptop devices, multi-processor systems, microprocessor-base systems, set-top boxes, programmable consumer electronics, network PCs, mini-computers, mainframe computers, distributed computing environments that include any of the above systems or devices and the like.

The invention may be described in the general context of computer-executable instructions, such as program modules, being executed by a computer. Generally, program modules include, but are not limited to, routines, programs, objects, components, and data stores that perform particular tasks or implement particular abstract data types. The invention may also be practiced in distributed computing environments where tasks are performed by remote processing devices that are linked through a communications network. In a distributed computing environment, program modules may be located in both local and remote computer storage media, including memory storage devices.

Turing again to FIG. 1A, an exemplary system includes a computing system, such as computing device 10. In its most basic configuration, computing device 10 typically includes at least one processing unit 12 and a memory 14. Depending on the exact configuration and type of computing device, memory 14 may be volatile (such as RAM), non-volatile (such as ROM), flash memory, etc. . . . ), or some combination thereof. This most basic configuration is illustrated in FIG. 1A by dash line 16. Additionally, device 10 may also have additional features and/or functionality. For example, device 10 may also include additional storage (removable and non-removable media) implemented in any method or technology for storage of information, such as computer-readable instructions, data stores, program modules or other data. Memory 14, removable storage 18, and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 10. Any such computer storage media may be part of device 10. Device 10 may also comprise communications connections 26 that allow the device to communicate with other devices.

Communication connections depicted at 26 are exemplary of communication media. Communication media typically embodies computer-readable instructions, data stores, program modules, or any other data in a modulated signal data such as a carrier wave or other transport mechanism and includes any information delivering media. The term "modulated-data signal" means a signal that has one or more of its characteristics set or changed in such a manner so as to encode information in the signal. By way of example, and not limitation, communication media includes wired media such as a wired network or direct-wired connection, and wireless media such as acoustic, RF, infrared, and other wireless media.

Device 10 may also have input device(s) 24, such as keyboard, mouse pen, voice input device, touch input device, etc. Furthermore, device 10 may also have output device(s) 22, such as, but not limited to, display, speakers, printers, etc. All these devices are well known in the art and need not be discussed at length here.

Figure 1B:
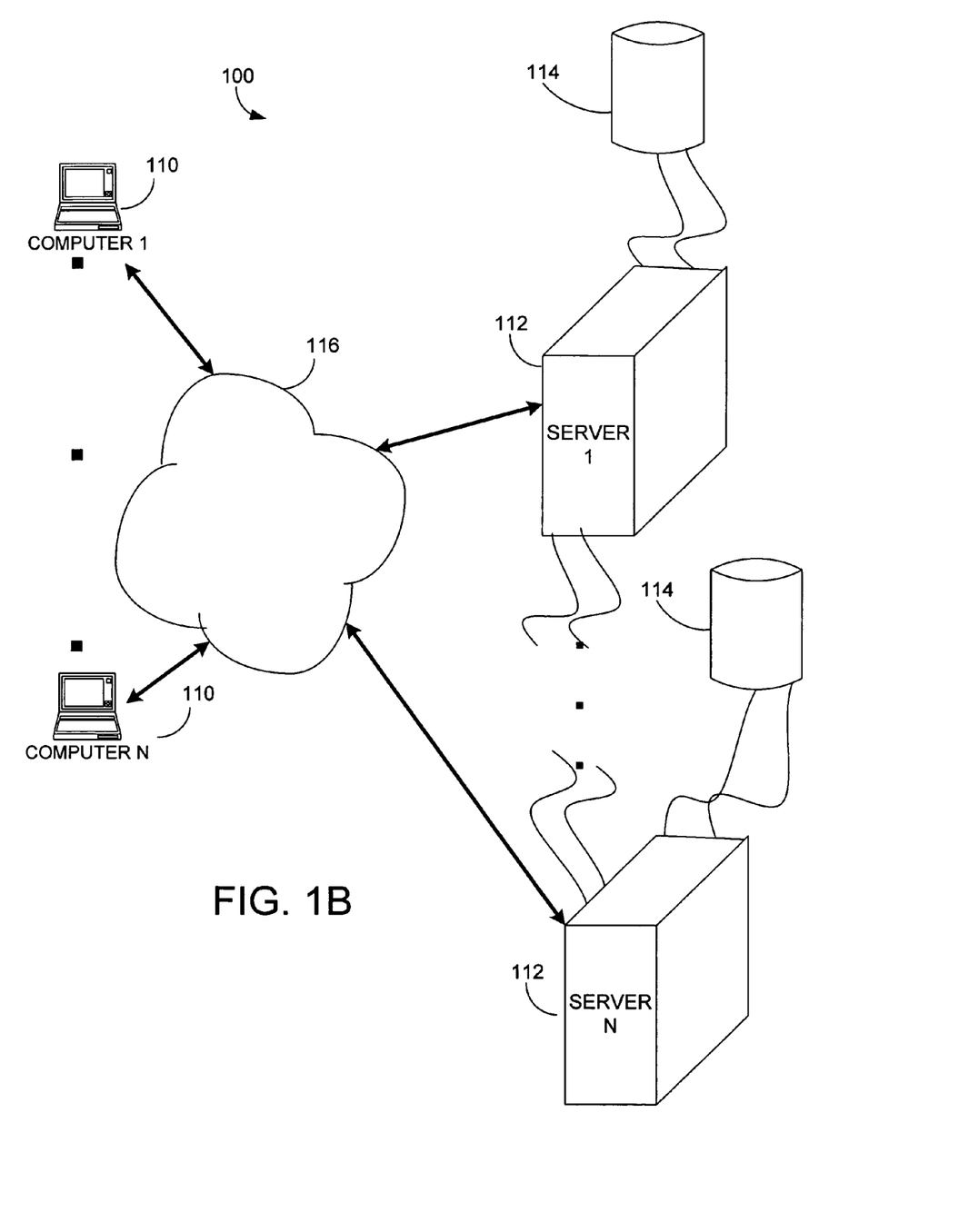
FIG. 1B illustrates an overview of a network environment implementing embodiments of the present invention.

Referring now to FIG. 1B, reference numeral 100 broadly illustrates one embodiment of a system for matching one unknown data point with one or more corresponding data points in a data structure. System 100 includes one or more computing devices 110 in communication with one or more servers 112 through a network 116. Servers 112 may be in communication with one or more data stores 114. Devices 110 and servers 112 may include, but are not limited to, servers, processors, personal computers, laptops, workstations, and other suitable devices. Network 116 may include, but is not limited to a local area network ("LAN"), a metropolitan area network ("MAN"), a wide area network ("WAN"), or combinations thereof. Furthermore, the aforementioned data stores may include, but are not limited to, databases, spreadsheets, and other suitable data storage devices.

The present invention may be practiced in distributed computing environments where tasks are performed by remote processing devices that are linked through a communications network 116. In a distributed computing environment, program modules may be located in both local and remote computer storage media including memory storage devices. In operation, devices 110 communicate data to servers 112 via the network connection.

Dimensional Reduction and Point Matching in Multi-Dimensional Space

Figure 1C:
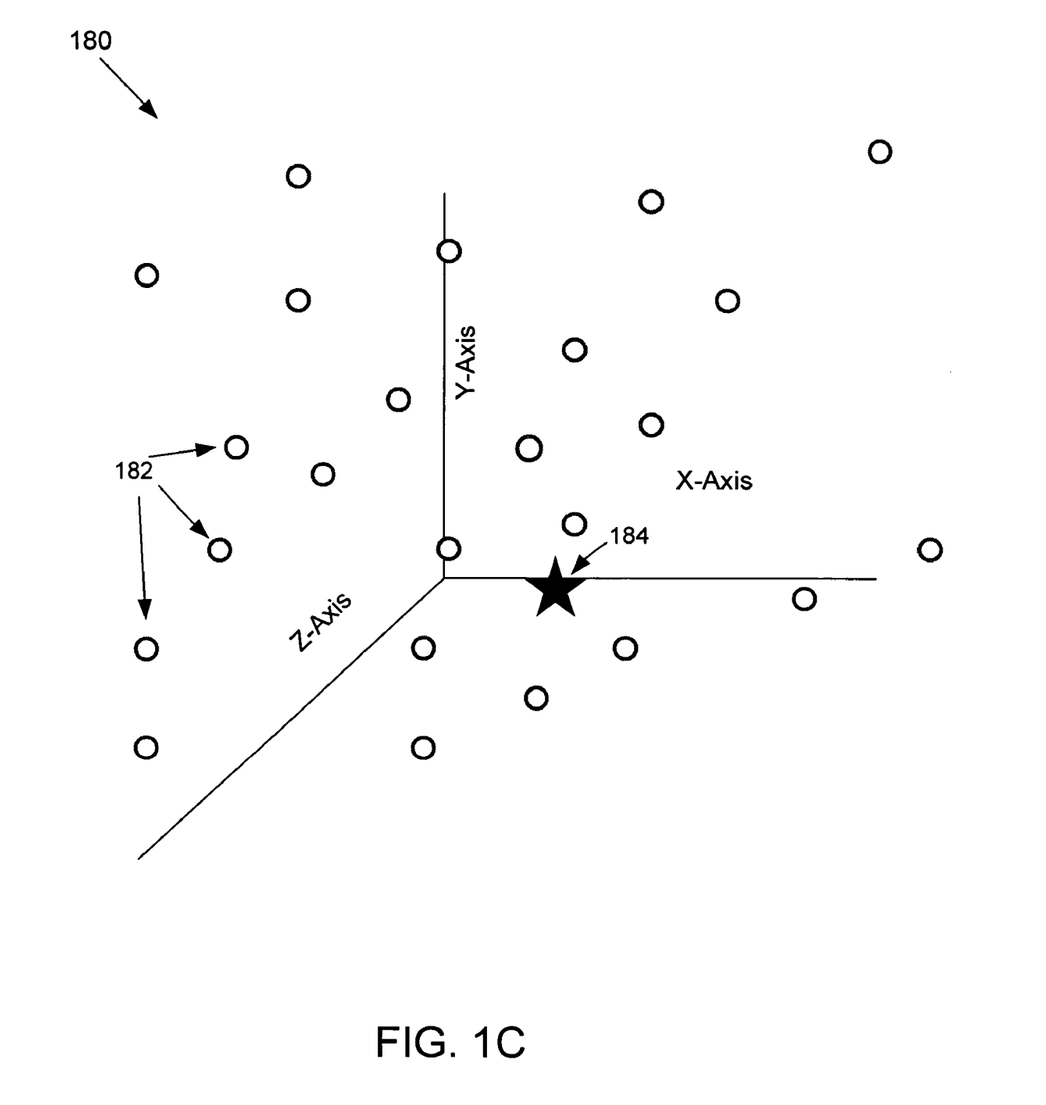
FIG. 1C illustrates a hypothetical three dimension data structure containing multiple known data points, which embodiments of the invention would use to match against an unknown data point.

As described above, matching unknown data points to known data points in a multi-dimensional data structure is complicated. A simple example of the problem is depicted in FIG. 1O. Here a three dimensional database 180 holds twenty-four known data points 182. Each data point 182 is a three point number and is mapped into multi-dimensional space. The star at 184 represents an unknown data point that is also mapped into multi-dimensional space according to its three point number. The goal is to determine whether the three point number representing the star is a match to one of the known points 182. The known point 182 is considered a match to unknown point 189, if the three point numbers match, or if they vary by an amount considered to be within a given tolerance level. In order to determine if the star matches a known point, the Euclidean distance from the star to each data point 182 is determined. If that distance is less than a given error amount, then the star matches the point. Using this method to determine the unknown point's identity, every data point in the database would need to be compared. While performing such a task may be simple in three dimensions with only twenty-four known data points, it becomes increasingly difficult as the dimensions and data size increase. Looking again at the audio fingerprinting example discussed above, the distances from the unknown 64 point number to each of the 1,000,000 known points mapped in 64 dimensions would have to be determined. Again, such a task is quite CPU intensive and time consuming.

A more efficient method to match unknown data points to known data points in multi-dimensional databases is provided and explained in detail below. An area of the data structure where possible matches exist is located. All data points lying outside of the area are eliminated as possible matches to the unknown point. This allows a system to compare a much smaller number of data points to the unknown, instead of having to compare every point in the database. By targeting and searching fewer data points, processor demands can be reduced.

Figure 1D:
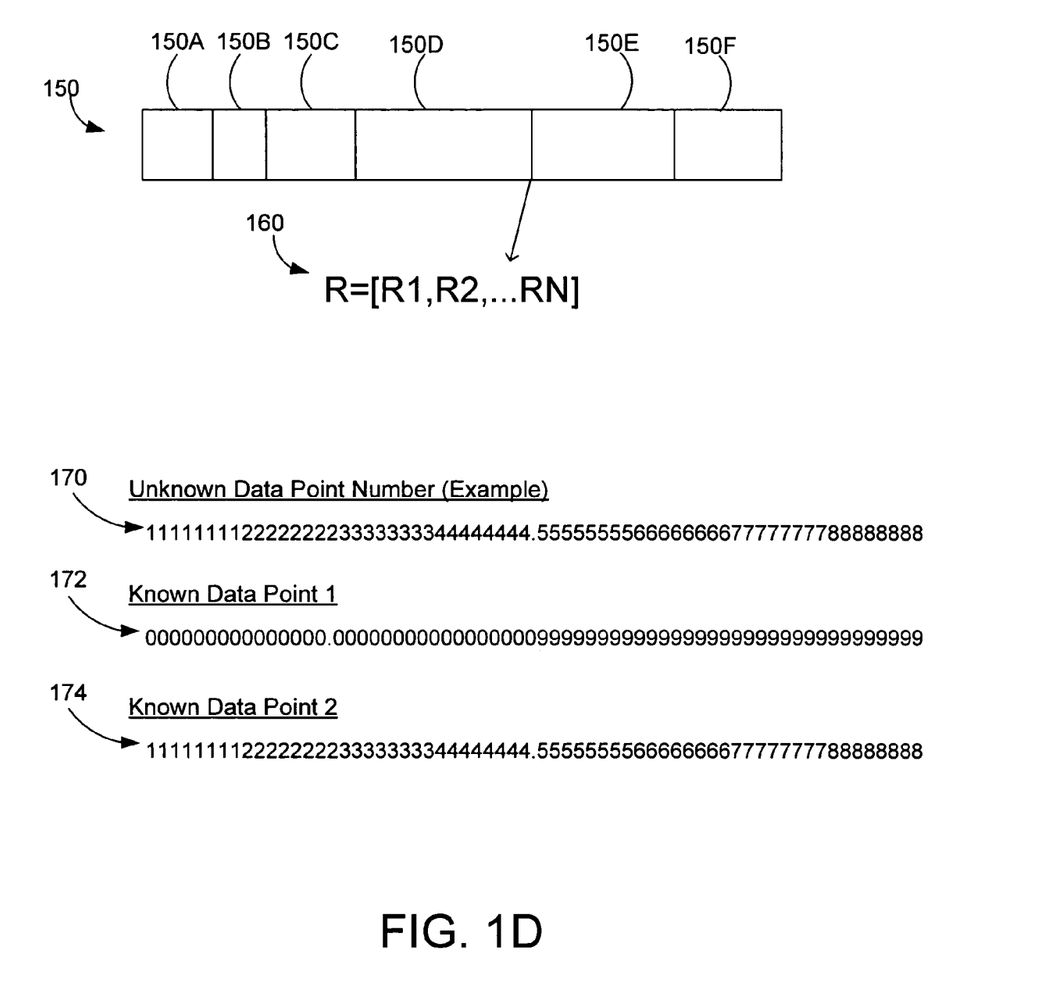
FIG. 1D illustrates the structure of an unknown data point, utilized by embodiments of the present invention, which would be compared against other data points having a similar structure. Also, FIG. 1C provides an example of an unknown data point and known data points.

Any comparison of data to data points in a multi-dimensional database may be addressed. For example, but without limitation, a data point may consist of a series of numbers of any numerical base, as shown in FIG. 1D at 150 and 160. Considering the audio fingerprinting example again, an unknown song may be processed into a 64 floating point number similar to the one at 170. Accordingly, every number represents a distance in a different dimension, which determines the unknown point's place in multi-dimensional space. Likewise, known data points for similar files 172 and 174 would have their own multi-dimensional coordinates. Again, FIG. 1D illustrates merely one example of the type of data used in matching processes. In reality, data points are comprised in many different ways; therefore, FIG. 1D should not be interpreted to limit the scope of this invention in any way.

Figure 1E:
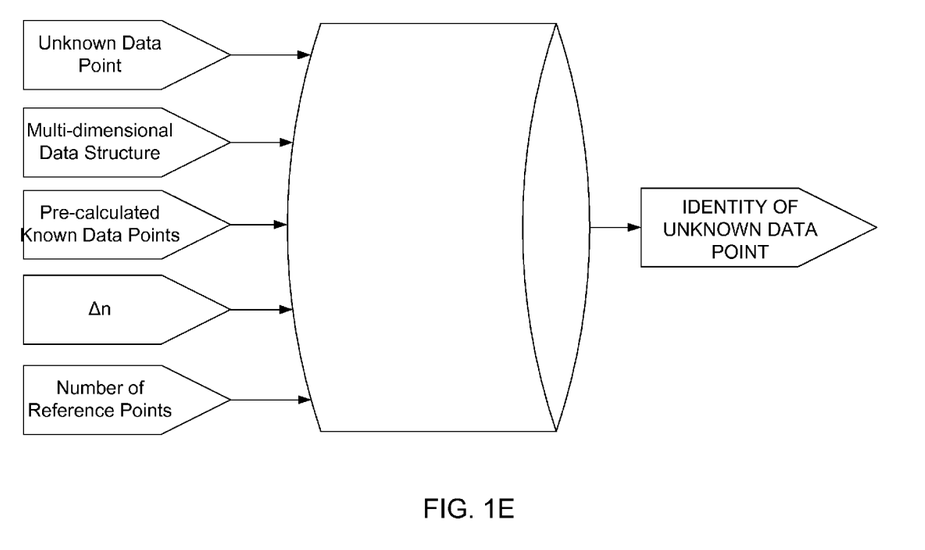
FIG. 1E illustrates the inputs and final output of embodiments of the present invention.

FIG. 1E depicts an overview of the process. In general, the process uses the following five inputs: an unknown data point, a multi-dimensional data structure, known data points, an application-specific distance ($\Delta n$), and a number of reference points. In the audio fingerprinting example, the unknown data point is the number representing the unknown song. The multi-dimensional data structure is the database containing the numerical representations of known songs. The unknown data points are the actual numbers in the database. The distance $\Delta n$ is a given for the 64 floating point numbers used in audio fingerprinting. The reference points are pre-calculated points used to quickly eliminate data points in the database that do not match the unknown point. As FIG. 1E shows, these five inputs are used to determine the unknown data point's match. Furthermore, FIG. 1E is only provided for explanatory purpose and should not be construed to restrict the scope of this invention in any away.

Figure 2:
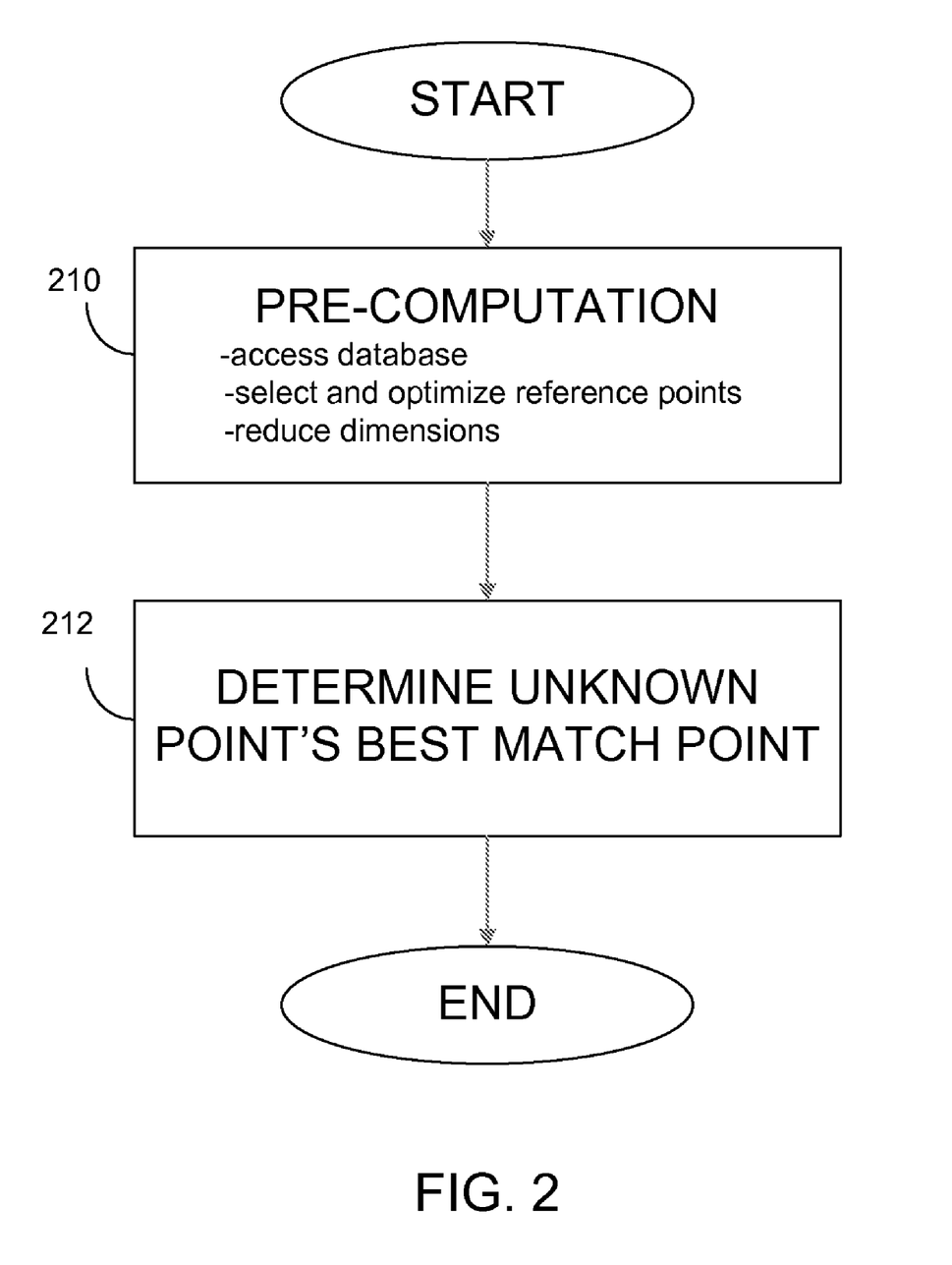
FIG. 2 illustrates a flow diagram detailing a general overview of an embodiment of the present invention.

The flowchart depicted in FIG. 2 illustrates the two main methods in determining a match to an unknown data point. The first method is the pre-computation stage 210. During this stage, a database is accessed, reference points are selected and optimized, and the database's dimensions are reduced. The reference points are then used to locate possible match points for unknown points. The remaining data points are then matched against the unknown point to determine its best match point 212.

Figure 3:
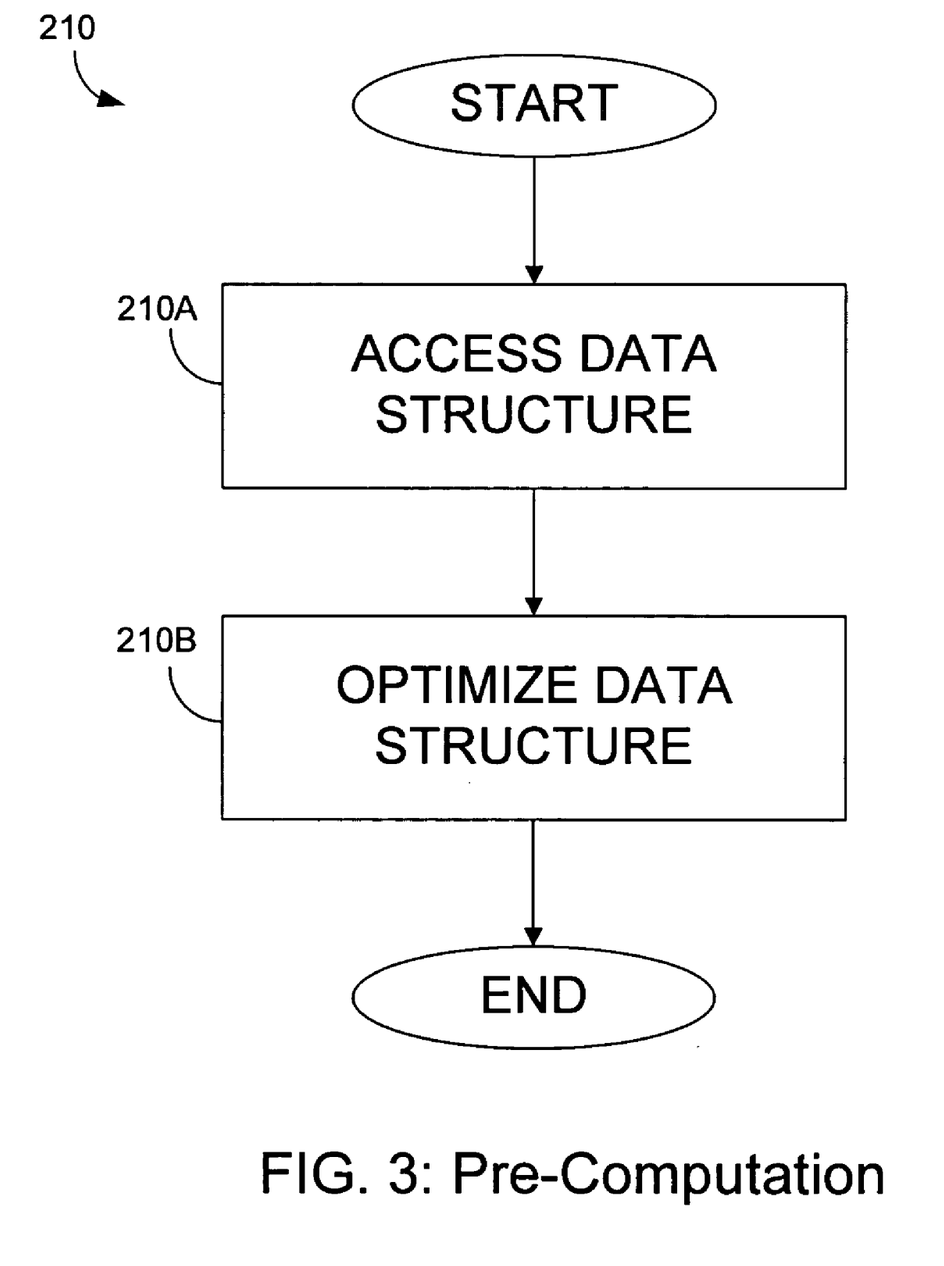
FIG. 3 illustrates a flow diagram of the pre-computation stage of an embodiment of the present invention.
Figure 4:
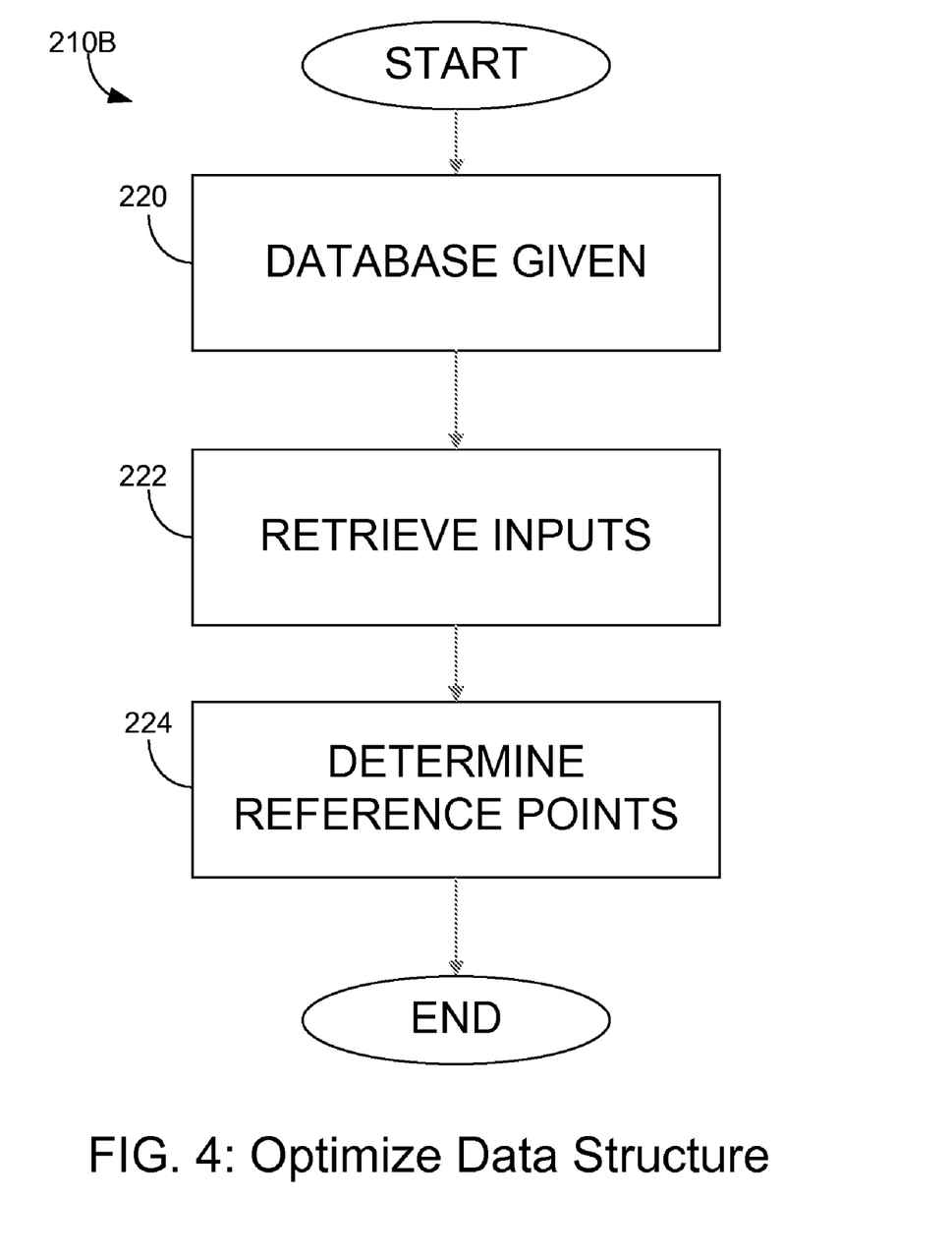
FIG. 4 illustrates a flow diagram detailing the process an embodiment of the present invention would use to optimize a data structure.
Figure 5:
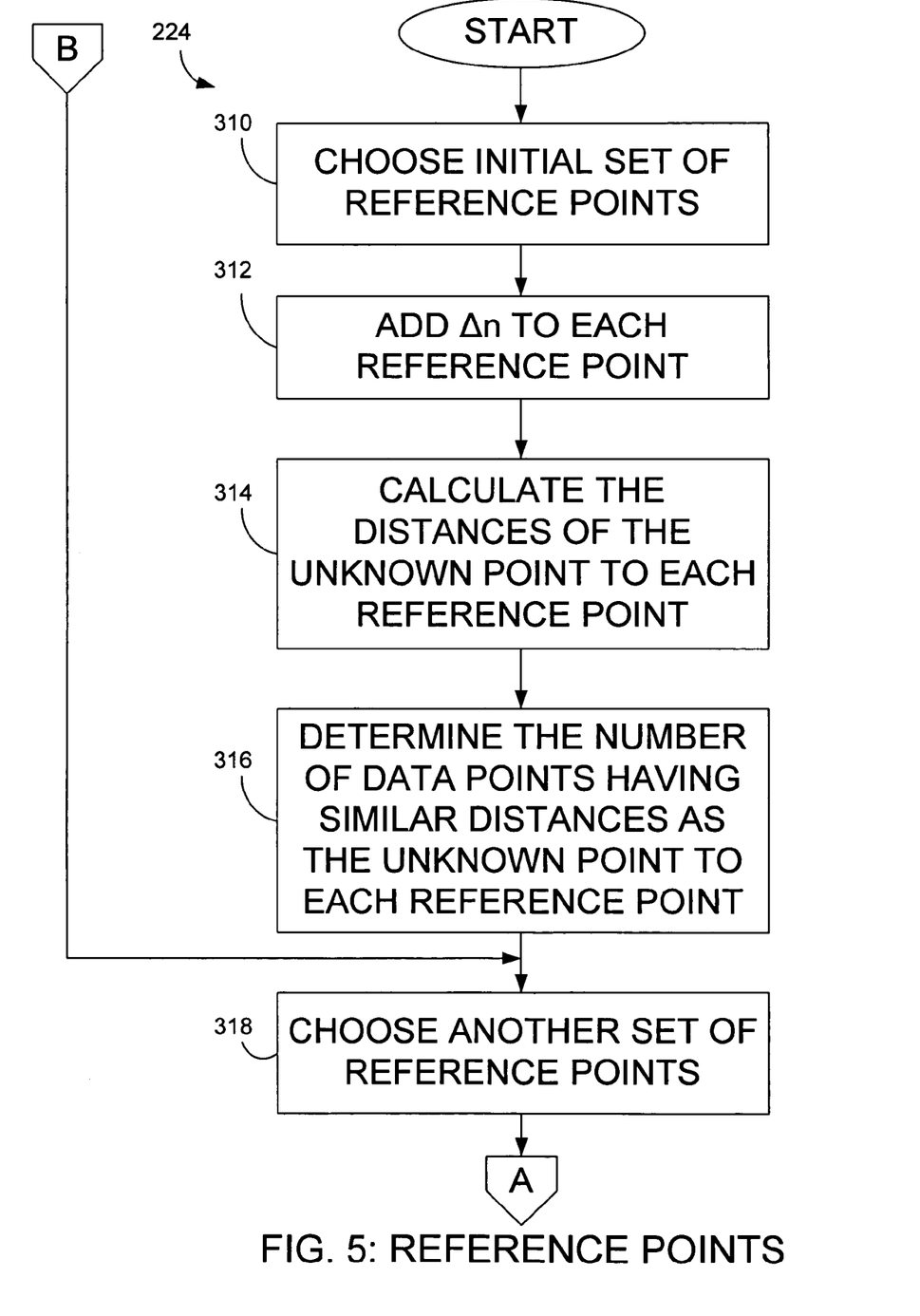
FIG. 5 illustrates a flow diagram of the process an embodiment of the present invention uses to select and optimize reference points.

FIGS. 3-5 further describe the pre-computation stage 210. Turning initially to FIG. 3, a multi-dimensional data structure is received at 210A. This can occur in any number of ways. For example, but without limitation, the invention may access a software program, contact a server, or communicate with another memory storage media. The structure itself consists of a multi-dimensional database that contains various known data points. The database is then optimized, as shown at 210B, to allow an unknown data point to be efficiently matched to known data points in the database, as is further described below.

Turning to FIG. 4, the optimization stage is described, beginning with the received database 220. A number of inputs are then retrieved, as shown at 222. The first input, $\Delta n$ 222, is a Euclidean distance the invention uses to eliminate known data points that do not possibly match the unknown point. Essentially, $\Delta n$ is a distance used to account for error. While an unknown data point should occupy the exact same point in multi-dimensional space as its match, in reality it does not always do so. Instead, the unknown point will often occupy a space very close to its match. Therefore, if a possible match point is within an allowable error distance ($\Delta n$) from the unknown point, it is considered a match. Furthermore, $\Delta n$ is application specific, and therefore set by the application or program. For example, the $\Delta n$ used in an audio application, such as matching an unknown mp3, would be different than the $\Delta n$ used in a digital image application, such as matching a digital photo.

The second input received is the number of dimensions of the data structure. Eventually, the invention will reduce the dimensions to the number of reference points. Both reference points and dimension reduction will be further discussed below. However, it is important to note that the dimensions are reduced in order to simplify distance calculations in multi-dimensional space. Taking the audio fingerprinting example again, distance calculations for points in the 64 dimension database are computed with respect to the specific reference points used. If six reference points were used, distances would be computed in six dimensions, instead of 64. As can be understood, dimension reduction allows the invention to locate possible matches faster.

The last input given is the number of reference points to use. Again, reference point selection and purpose are discussed at length below. However, the number of reference points to use is an input that is determined by performance and results. Fewer reference points will eventually yield more possible match candidates, thus hindering the invention's ability to eliminate data points. On the other hand, using many reference points will require a greater number of distance calculations. Therefore, the number of reference points to choose is predetermined and given as an input.

After receiving the above inputs, the next step in the pre-computation stage 210 is to select reference points 224. These are points in multi-dimensional space the invention uses to reduce the number of possible matches in the database. Specifically, the reference points triangulate a portion of the database where possible matches to the unknown point exist. All points lying outside the triangulated area are not considered possible matches and are eliminated. Eventually, reference points allow the invention to find a relatively small number of data points that lie a similar distance away from each reference point as the unknown point does. For example, suppose six reference points are used. Eventually, the invention would find every data point in the database that had similar distances (accounting for an error of $\Delta n$) to each reference point as the unknown point. This would yield a relatively small number of possible match points, which would significantly reduce the number of data points needing searched.

The positions of the reference points are crucial to effectively eliminate as many possible match candidates as possible, given any unknown point. If the reference points are placed too close together, the benefits of triangulation are lost. If they are too far apart, the triangulation process will yield many results, thus making it ineffective. Therefore, the reference points are optimized in order to maximize their efficiency in reducing data points. Once optimized, the reference points can be used to match numerous unknown data points as they exist. However, if any new data points are added to the database, the reference points can be re-optimized to increase their efficiency.

The order of the reference points is also very important. Because each reference point will eliminate data points in the database as possible match candidates to the unknown, it is ideal for the first reference point to make the largest reduction. After the first reference point reduces a large portion of the data set, subsequent reference points have a much smaller set of data points to concentrate on. In effect, this speeds up queries made to servers and reduces the time needed to locate an unknown point's match. Therefore, it is acceptable to sacrifice the overall efficiency of the reference point set in order to get the first point to make the largest possible reduction.

Moreover, the invention reduces the database's number of dimensions by the reference points. Therefore, instead of calculating distance measurements with respect to every dimension of the data structure, such a query must only be performed with respect to the reference points. Considering the audio fingerprinting example once more, without limitation, if six reference points were used, the 64 dimension database would effectively be reduced to six dimensions. Distance calculations, then, could be done in six dimensions, rather than 64, requiring less processor power and time. As a result, the pre-computation calculations can be performed much quicker using fewer dimensions. These simpler computations require less from a processor.

FIG. 5 further describes the process of selecting and optimizing reference points. Initially, a set of reference points are chosen at 310 by randomly selecting a first point in multi-dimensional space. For example, one embodiment simply selects the mean of all the known data points. Then, the remaining number of reference points are chosen using a linearly independent vector set. Next, $\Delta n$ is added to each reference point as shown at 312. To determine the reference point's efficiency at data reduction, a subset of the actual points in the database are used as test points. Each subset point's distance away from each initial reference point is calculated at 314. Then, the number of subset points having similar distances away from each reference point as the unknown point are determined, as shown at 316. In other words, the invention looks at how far away the unknown point is from each reference point and counts the number of subset points that are similar distances away from each reference point. Eventually, this eliminates many of the subset points, and the efficiency of the reference points can be measured by the number of points eliminated. Accordingly, the optimal set of reference points will reduce the largest quantity of subset points.

However, in order to obtain an optimal set, the invention compares results from different groups of reference points. To get a new set of reference points at 318, the invention adds a random multi-dimensional vector to each previous reference point as shown at 320. Then, the distances of each subset point to each new reference point is calculated at 322. Once again, the number of subset points having similar distances away from each reference point as the unknown point are computed, as shown at 324. The number of possible matches resulting from the new reference points is then compared to the number of possible matches given by the previous reference points, at 326 and 328. If the new reference points produce fewer possible match points than the previous reference points, then the new reference points are used, as shown at 328, and the process is repeated. Otherwise, the previous reference points are considered the optimal set. Furthermore, in embodiments the processes of comparing the results of reference points can be parallelized; whereby, the best results achieved by any machine are sent to all other machines.

Figure 6:
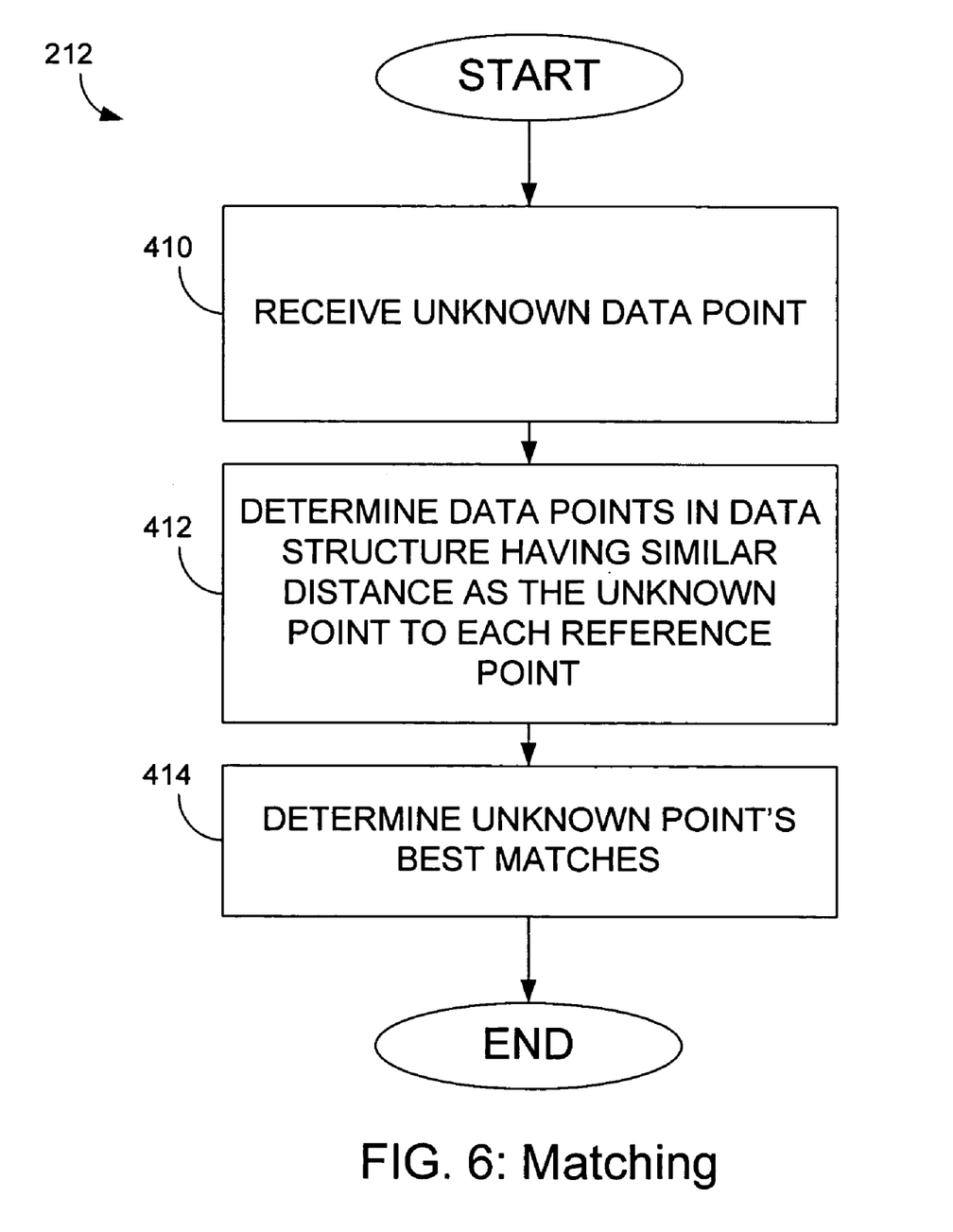
FIG. 6 illustrates a general flow diagram of the overall process an embodiment of the invention would use to match unknown data points to data points in a multi-dimensional data structure.

Once the optimal reference points are determined, they can be used to reduce the number of data points in the database considered possible matches to unknown points. This is the process of stage 212 and is further described in FIG. 6. As shown in FIG. 6, once the pre-computation stage 210 is completed, an unknown data point can be received for matching, as shown at 410. Then, as shown at 412, the distance of the unknown point to each reference point is computed.

In the optimization stage, the distance of each known point in the database from each reference point is measured and stored. Then, as part of step 412, the distance of the unknown point to each reference point is determined. All data points having a similar distance to the reference point (as compared to the distance of the unknown data point) are determined. It is considered to be a similar distance if the distances are within $\Delta n$ of the unknown point. Of the remaining points, the closest one to the unknown is considered its match point 414.

Thus, instead of matching the unknown point against all of the data points in the database, only a small number of possible candidates produced by the optimal reference points need to be compared. Data points having similar distances away from each reference point as the unknown are considered possible match candidates. From these possibilities, a server can determine which one is closest in multi-dimensional space to the unknown point.

In order to visualize exactly how the invention works from start to finish, consider the audio fingerprinting example. Assume a media player receives a .wav file that has missing metadata. As a result, the player cannot determine the song's title and artist. After processing the file, a 64 floating point number is returned that represents the song's identity. To match the song's identity with a known song in the database, the media player accesses, via a network connection, a large database of songs contained in a storage medium. Assume the database is a 64 dimension structure housing 1,000,000 songs that are also represented as 64 floating point numbers. Accordingly, the unknown data point is mapped into 64 dimensional space along with the 1,000,000 known songs.

Instead of comparing the numbers of every song to the number of the unknown song, a smaller search is conducted. Because the invention is asked to match .wav files, it receives a specific Δn and number of reference points to use. Suppose that six reference points are intended to be used. Six points are then mapped alongside the unknown and known data points. Further, the invention randomly selects a subset of the database, consisting of 20,000 data points, for reference point optimization. Within the subset, every data point's distance to each reference point is calculated. Then, the reference points are used in order to reduce data. Using each subset point's calculated distance to each reference point, the invention computes the number of data points having similar distances away from each reference point as the unknown data point. To accommodate for error, the absolute value of the data point's Euclidean distance to the reference point is checked to ensure it is within the error distance Δn. Consider that after all six reference points have reduced the data set, 250 possible match points are left. A small distance is then added to each initial reference point, and the aforementioned process is repeated. This time, assume that three possible match candidates are returned. Since the second set of reference points returned fewer possible matches in the subset than the first set of reference points, the second set is used as the optimal reference points.

Next, the invention measures the distance of the unknown point and every known data point to each reference point. The reference points are applied in order, and data points having distances away from any reference point greater than the unknown point's distance plus Δn are eliminated. This process will return a relatively small number of data points that can be considered possible matches. If one data point remains, it is considered the unknown's match. If multiple points are left, the one closest to the unknown is considered its match.

In sum, this invention significantly reduces the number of pre-calculated data points in a multi-dimensional database needing to be compared against an unknown point in order to find its match. Reference points allow the invention to effectively target and locate a much smaller quantity of points to consider as possible matches. This eliminates the need to compare the unknown point with every possible data point, thus cutting down time and processor requirements to identify an unknown piece of data.

The foregoing descriptions of the invention are illustrative, and modifications in configuration and implementation will occur to persons skilled in the art. For instance, while the present invention has generally been described with relation to FIGS. 1-6, those descriptions are exemplary. Accordingly, the scope of the invention is to be limited only by the following claims.

The invention claimed is:

1. A computer-implemented method for matching a first data point representing an unknown audio file with a second data point representing a known audio file within a multi-dimensional database, comprising:
   receiving at least one data structure, said at least one data structure containing said second data point and one or more third data points;
   determining an optimal set of least two reference points so as to dimensionally reduce said at least one data structure,
   wherein determining said optimal set of at least two reference points comprises:
   (1) retrieving a Euclidean distance for said at least one data structure~
   (2) choosing a first set of at least two reference points,
   (3) computing the distance from each data point in said at least one data structure to each reference point in said first set of at least two reference points,
   (4) determining the quantity of data points having substantially the same distance, within the absolute value of said Euclidean distance, to each reference point in said first set of at least two reference points as said first data point, and
   (5) determining whether another set of at least two reference points would identify fewer data points in said data structure as possible match points to said first data point as said first set of at least two reference points; and based on said optimal set of at least two reference points, matching said first data point with said second data point.

2. The method according to claim 1, wherein dimensionally reducing said data structure at least one data structure further comprises:
   measuring the distances for said second data point and said one or more third data points contained in said at least one data structure with respect to said optimal reference points.

3. The method according to claim 1, wherein matching said first data point with said second data point further comprises:
   determining the distance between said first data point and said second data point;
   comparing said distance between said first data point and said second data point with another Euclidean distance given as a possible error amount;
   if said first data point's distance away from said second data point is less than said Euclidean distance, then said second data point is considered said first data point's match; otherwise, said second data point does not match said first data point.

4. The method of claim 1, further comprising:
   choosing a second set of at least two reference points;
   adding said Euclidean distance to said second set of at least two reference points;
   determining the quantity of data points having substantially the same distance to said second set of at least two reference points as said first data point;
   if said quantity of data points having substantially the same distance to said second set of reference points from said first data point is greater than the quantity of data points having substantially the same distance to said first set of at least two reference points from said first data point, then use said first set of at least two reference points to match said first data point with said second data point;

if said quantity of data points having substantially the same distance to said second set of reference points from said first data point is less than the quantity of data points having substantially the same distance to said first set of at least two reference points from said first data point, then compare the quantity of reference points produced by the second set of at least two reference points with a quantity of data points returned from selecting a new set of at least two reference points.

5. A computer-readable medium having computer-executable components executing instructions to perform the method of claim 1.

6. A computer-readable medium having computer-executable instructions for performing the method of claim 3.

7. A computer-implemented method for matching an unknown audio file with a second audio file, comprising:

processing said unknown audio file into a numerical data point;

receiving at least one data structure, said at least one data structure containing a data point identifying said second audio file and one or more data points identifying one or more third audio files;

determining an optimal set of at least two reference points so as to dimensionally reduce said at least one data structure, wherein determining said optimal set of at least two reference points comprises;

(1) retrieving a Euclidean distance for said at least one data structure, (2) choosing a first set of at least two reference points, (3) adding said Euclidean distance to said at least two reference points, (4) computing the distance from each data point in said data structure to each reference point in said first set of at least two reference points, (5) determining the quantity of data points having substantially the same distance to each reference point in said first set of at least two reference points as said unknown audio file data point, and (6) determining whether another set of at least two reference points would identify fewer data points in said data structure as possible match points to said unknown audio file data point as said first set of at least two reference points; and based on said optimal set of at least two reference points, matching said unknown audio file data point with said second audio file data point.

8. The method according to claim 7, wherein dimensionally reducing said data structure at least one data structure further comprises:

measuring the distances for said second audio file data point and said one or more third audio file data points contained in said at least one data structure with respect to said reference points.

9. The method according to claim 7, wherein matching said unknown audio file data point with said second audio file data point further comprises:

determining the distance between said unknown audio file data point and said second audio file data point;

comparing said distance between said unknown audio file data point and said second audio file data point with another Euclidean distance given as a possible error amount;

if said unknown audio file data point's distance away from said second audio file data point is less than said Euclidean distance, then said second audio file data point is considered said unknown audio file data point's match;

otherwise, said second data point does not match said first data point.

10. The method of claim 7, further comprising:

choosing a second set of at least two reference points;

adding said Euclidean distance to said second set of at least two reference points;

determining the quantity of data points having substantially the same distance to said second set of at least two reference points as said unknown audio file data point;

if said quantity of data points having substantially the same distance to said second set of reference points from said unknown audio file data point is greater than the quantity of data points having substantially the same distance to said first set of at least two reference points from said unknown audio file data point, then use said first set of at least two reference points to match said unknown audio file point with said second audio file data point;

if said quantity of data points having substantially the same distance to said second set of reference points from said unknown audio file data point is less than the quantity of data points having substantially the same distance to said first set of at least two reference points from said unknown audio file data point, then compare the quantity of reference points produced by the second set of at least two reference points with a quantity of data points returned from selecting a new set of at least two reference points.

11. A computer-readable medium having computer-executable components executing instructions to perform the method of claim 7.

12. A computer-readable medium having computer-executable instructions for performing the method of claim 9.

* * * * *